No. 686,678.  
A. P. MILLARD.  
SEAT FOR TWO WHEELED VEHICLES.  
(Application filed Sept. 11, 1901.)  
Patented Nov. 12, 1901.
(No Model.)
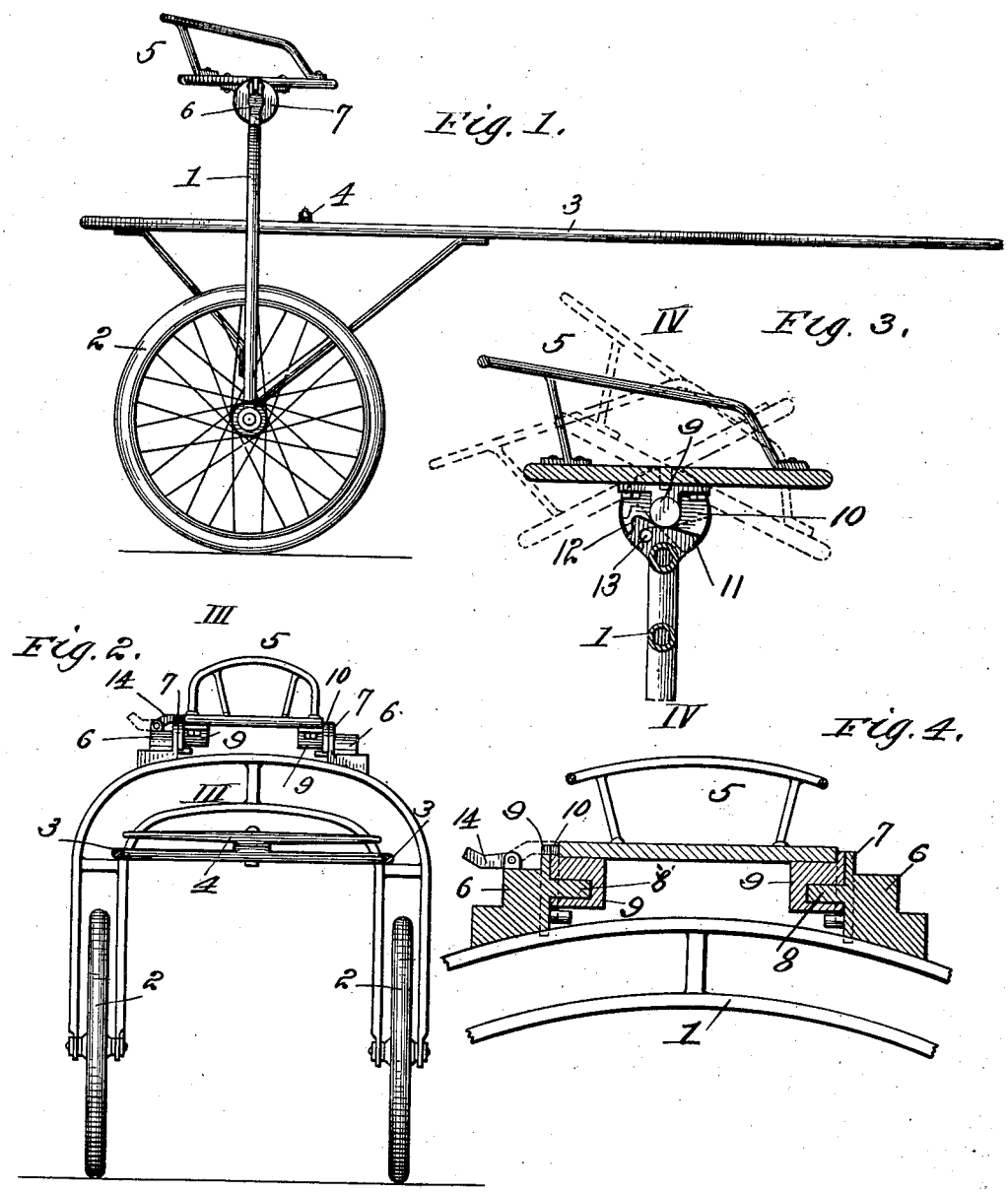
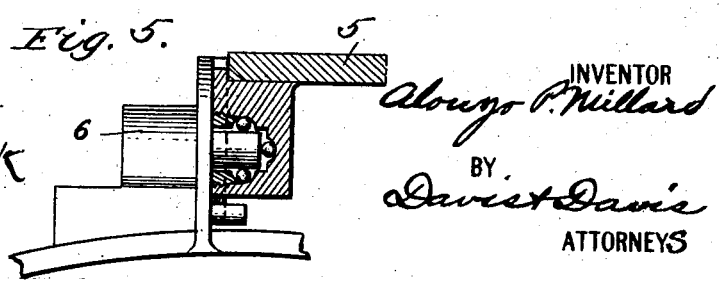
WITNESSES:
INVENTOR  
Alonzo P. Millard  
BY  
Davis & Davis  
ATTORNEYS

UNITED STATES PATENT OFFICE.

ALONZO P. MILLARD, OF DAYTON, OHIO, ASSIGNOR TO WILLIAM J. BREWER, OF NEWARK, NEW JERSEY.

SEAT FOR TWO-WHEELED VEHICLES.

SPECIFICATION forming part of Letters Patent No. 686,678, dated November 12, 1901.

Application filed September 11, 1901. Serial No. 75,033. (No model.)

*To all whom it may concern:*

Be it known that I, ALONZO P. MILLARD, a citizen of the United States, and a resident of Dayton, county of Montgomery, State of Ohio, have invented certain new and useful Improvements in Seats for Two-Wheeled Vehicles, of which the following is a specification, reference being had therein to the accompanying drawings, in which—

Figure 1 is a side elevation of a racing-sulky with the improved seat applied thereto; Fig. 2, a front elevation thereof, the shafts being in section; Fig. 3, a longitudinal sectional view of the seat, taken on the line III III of Fig. 2; Fig. 4, a transverse sectional view of the seat, taken on the line IV IV of Fig. 3; and Fig. 5, a detail showing one of the seat-pivots mounted on ball-bearings.

In the ordinary racing-sulky the driver's seat and the shafts are rigidly fastened to the frame of the vehicle. The result of this, as is obvious, is that as the horse moves up and down while in motion, and especially when racing, the frame of the sulky is tilted first backward and then forward, and the angle of the seat with respect to the ground is constantly varying, moving the driver with it and causing what is known as "horse motion." It will therefore be seen that the horse performs the unnecessary labor of shifting backward and forward the weight of the driver. The constant variation in the position of the seat and of the driver, in addition to causing unnecessary labor for the horse, is disagreeable to the driver and impairs the speed of the horse.

The object of this invention is to provide a seat for two-wheeled vehicles, and especially for racing-sulkies, which will enable the driver to maintain the seat at a fixed angle during the motion of the horse irrespective of the position of the frame supporting the seat, and, further, to enable the driver to maintain his weight in a vertical plane passing through the centers of the transporting-wheels. By these means the horse motion hereinbefore referred to is avoided—that is, the horse is relieved of the labor and drag of shifting the weight of the driver backward and forward and the driver is relieved of the strain and discomfort resulting from the constant changing of the angle of the seat. It is obvious that by relieving the horse of the labor and strain which is the result of this horse motion greater speed will be attained with less discomfort to both the horse and the driver.

Referring to the various parts by numerals, 1 designates a vertical arched supporting-frame formed of two parallel arched bars suitably connected together and braced. On transverse axles mounted in the corresponding lower ends of the bars which form the frame are the transporting-wheels 2. Secured rigidly to the frame are the shafts or thills 3, which carry the usual singletree 4. Above the frame is the seat 5, which is pivotally supported on the top thereof by means of the two standards 6. These are rigidly mounted on the frame, one on each side of the longitudinal center thereof, and are provided with the vertical disks 7 on their inner faces, horizontal pivots 8 extending inward from the centers of the disks. The centers of the pivots are in a vertical plane passing through the centers of the wheels. To the bottom of the seat, at the transverse center thereof, are secured socket-pieces 9, one near each edge thereof, into the sockets of which the pivots 8 extend. It will thus be seen that there may be a pivotal or swinging motion between the seat and the frame and that one half of the seat will be in the rear of its pivot, the other half being forward thereof, so that the center of gravity of the driver will be directly through the pivot of the seat and the axles of the wheels. It is preferred that these pivots 8 be mounted on ball or any other suitable antifriction bearings, as shown in Fig. 5, so that there will be little or no friction on the pivots. The object of this structure is to permit the seat to be held by the driver against rocking motion, so that the driver's body will remain practically in the same position during the movement of the horse—that is, during the vibration or backward and forward movement of the frame the seat will remain horizontal or at such an angle as the driver may desire to hold it, and this position of the seat will not be changed during the movement of the horse.

By the use of a sulky provided with a seat-mounting, such as described, which will avoid the horse motion common to sulkies having the seat rigidly secured to the frame the speed of the horse will be materially increased. By pivoting the seat on the frame directly over the centers of the wheels on horizontal pivots which are parallel with the wheel-axles the driver will be able to maintain his weight directly over the center of the transporting-wheels at all times during the movement of the horse. The adjustment of the seat with respect to the frame for this purpose will be accomplished by a slight bending of the driver's knees and ankles, which movement will be practically an unconscious one made by the driver to maintain his equilibrium. If the seat-pivots be mounted on ball-bearings, there will be little or no friction for the driver to overcome in maintaining the seat horizontal. In addition to relieving the horse of unnecessary labor and irritation a seat mounted as described will relieve the driver of that constant and rapid rocking motion which is so disagreeable to drivers of two-wheeled vehicles. When the seat is not occupied by the driver, it is free to swing either forward or backward on its pivots. To limit this motion of the seat, the socket-pieces 9 are provided with disks 10 on their outer faces, which are of substantially the same diameter as the disks 7, carried by the standards 6. Below and forward of the pivots these disks 10 are cut away to form cam-surfaces 11, which contact with the arch 1 and limit the forward rocking movement of the seat. In the rear of the pivots these disks are cut away to form hooks 12, which are adapted to engage inward-extending pins 13, carried by the rigid disks 7 of the standards to thereby limit the rearward rocking motion of the seat. By means of these hooks and pins the arch 1 is protected on its rear side from the wear of the disk, and it is obvious that if desired a similar arrangement may be employed to limit the forward motion of the seat, thereby relieving the arch of the wear of the cam-surfaces 11. It will also be obvious that any other suitable means may be employed to limit the rocking motion of the seat and that any other form of pivotal mounting for the seat may be employed.

To lock the seat in a horizontal position to permit the driver to readily take his position therein or to dismount therefrom, notches are cut in the upper edges of one set of adjoining disks 7 and 10, which notches register with each other when the seat is in horizontal position. Pivoted on the standard 6 adjacent to the notched disks is a latch 14, which is adapted to fit in the notches of the disks and lock the disk 10 to the disk 7, and thereby prevent any movement of the seat on its pivots. This latch is pivoted in such a manner that it will work hard on its pivot to prevent its being accidentally displaced and to prevent its rattling or vibrating when it is released from the notches during the movement of the horse. It is obvious that any other suitable device may be employed to lock the seat, and that while it is desirable to have such a device it is not essential and may be dispensed with, if desired.

The invention is shown as applied to a racing-sulky; but it is obvious that it may be applied to any form of two-wheeled vehicles or agricultural implements, and while the seat is shown as mounted on an arched frame it will be understood that it may be mounted on any suitable form of frame, and I therefore do not wish to limit myself to the use of an arched frame or to the use of the seat on racing-sulkies.

Having thus described my invention, what I claim as new, and desire to secure by Letters Patent, is—

1. The combination of a vehicle-frame pivotally mounted at its lower end, a seat, means for supporting said seat on the frame to permit the frame to have a backward and forward swinging motion without varying the angle of the seat and means for locking said seat to the frame to prevent the pivotal motion between the frame and seat.

2. In a vehicle-seat, the combination of a supporting-frame, a seat, horizontal transverse pivots for said seat, means for supporting said pivots on the frame, and means for limiting the pivotal movement between the seat and the frame.

3. In a vehicle-seat, the combination of a pivoted supporting-frame, a seat, a horizontal pivot for said seat, said pivot being adjacent to and parallel with the transverse center of the seat, means for supporting the pivot on the frame, whereby there will be a pivotal motion between the seat and the frame and the frame may have a backward and forward swinging movement without varying the angle of the seat.

4. In a seat for a two-wheeled vehicle, the combination of an arched frame in which the transporting-wheels may be mounted, a seat, means for pivotally mounting the seat on the top of the frame, said pivots being parallel with and adjacent to the transverse center of the seat.

5. In a seat-mounting for a two-wheeled vehicle, the combination of a frame in the lower ends of which transporting-wheels may be mounted, a seat above the frame, means for pivotally mounting said seat on the frame, said pivotal means being below and parallel with the transverse center of the seat, and means for limiting the pivotal movement between the frame and the seat.

6. In combination, a vertical frame mounted at its lower ends on transporting-wheels and adapted to swing backward and forward at its upper end, a seat, and means for pivotally mounting the seat on the frame, the center of the pivot of said seat being above the centers of the transporting-wheels in a vertical plane passing through the centers of the said axles thereof and parallel therewith.

7. In combination, a vertical arched frame having a wheel mounted in each of its lower ends, a seat, and means for pivotally mounting the seat on the frame, said pivots being adjacent to the transverse center of the seat above the centers of the wheels and parallel with the axles thereof and in a vertical plane passing through the centers of the wheels.

8. In combination, a pair of transporting-wheels a frame pivotally mounted on the axles thereof whereby its upper end may swing forward and rearward, a seat, means for mounting the seat on the frame whereby the frame may swing without varying the angle of the seat, and means for locking the seat to the frame to prevent the independent pivotal movement between the frame and the seat.

In testimony whereof I hereunto affix my signature, in the presence of two witnesses, this 7th day of September, 1901.

ALONZO P. MILLARD.

Witnesses:
A. H. REIST,
ALBERT KERN.